United States Patent [19]

Botterill et al.

[11] Patent Number: 5,682,169
[45] Date of Patent: Oct. 28, 1997

[54] METHOD AND SYSTEM FOR PRESENTATION OF SINGLE AND DOUBLE DIGIT SELECTION FIELDS IN A NON-PROGRAMMABLE TERMINAL

[75] Inventors: John Howard Botterill; Stephen Troy Eagen; Harvey Gene Kiel; James Albert Pieterick; Devon Daniel Snyder, all of Rochester, Minn.

[73] Assignee: International Business Machines Corporation, Armonk, N.Y.

[21] Appl. No.: 271,224

[22] Filed: Jul. 6, 1994

Related U.S. Application Data

[63] Continuation of Ser. No. 976,108, Nov. 13, 1992, abandoned.

[51] Int. Cl.[6] .............................. G09G 5/08; G06F 3/00
[52] U.S. Cl. .............................. 345/2; 345/146; 395/329
[58] Field of Search .................................... 340/525, 706, 340/717, 790; 345/1, 2, 145, 146, 156, 168; 395/155, 156, 329, 352, 353, 331, 200.05, 326

[56] References Cited

U.S. PATENT DOCUMENTS

| | | | |
|---|---|---|---|
| 4,763,117 | 8/1988 | Blattner et al. | 345/146 |
| 4,821,211 | 4/1989 | Torres | 364/521 |
| 4,862,390 | 8/1989 | Weiner | 345/146 |
| 4,954,966 | 9/1990 | Mooney et al. | 364/518 |
| 4,962,531 | 10/1990 | Sipman | 380/24 |
| 4,967,190 | 10/1990 | Fujisaki et al. | 340/700 |
| 5,050,105 | 9/1991 | Peters | 364/521 |
| 5,109,487 | 4/1992 | Ohgomori et al. | 395/148 |
| 5,129,056 | 7/1992 | Eagen et al. | 340/706 |
| 5,173,854 | 12/1992 | Kaufman et al. | 395/800 |
| 5,197,124 | 3/1993 | Busboom et al. | 395/155 |

FOREIGN PATENT DOCUMENTS

| | | |
|---|---|---|
| 0371377 | 6/1990 | European Pat. Off. . |

OTHER PUBLICATIONS

Telecom Report vol. 8, No. 5, Sep. 1985, Berlin, B.R.D. pp. 343–349; Peter Pawlita: "Format service Bermuda und Menüobe Flächen Für Effective Rechnernutzung" (Telecom Report).

IBM Systems Journal vol. 27, No. 3, 1988, Armonk, U.S.A. pp. 281–299; R.E. Berry: "Common User Access–A Consistent And Usable Human–Computer Interface for the SAA Environments" (SAA).

Using Mac Write and Mac Paint; field, Tim. Osborne McGraw–Hill Publishing, 1984, pp. 10–17.

IBM Technical Disc. Bulletin vol. 34 No. 1, Jun. 1991, "Menu Customizing".

IBM Technical Disc. Bulletin vol. 27 No. 7A, Dec. 1984, N.J. Temple "Interactive Menu Tailoring".

Primary Examiner—Richard Hjerpe
Assistant Examiner—Kara Farnandez Stoll
Attorney, Agent, or Firm—Andrew J. Dillon

[57] ABSTRACT

A method and system are disclosed which permit the presentation of single and double digit selection field in a non-programmable terminal. Multiple numeric characters associated with particular textual choices are coupled to a workstation controller interface along with an identified offset within each textual choice to a selected mnemonic character. If an associated terminal display device does not support more advanced graphic elements, such as so-called "radio buttons" and underscored mnemonics, the numeric characters and textual choices are entered into a format table entry and utilized to specify a selection field within the terminal display. A single or double digit numeric indicator area is then defined within the terminal display and numeric entries within the selection field are displayed within the numeric indicator area, permitting the user to visually affirm what textual choice will be selected upon entry. A selected textual entry is then displayed utilizing highlighting or reverse video, providing a simulation of graphic entry techniques while permitting direct selection of any textual choice. If an associated terminal supports advanced graphic elements, the offset value is utilized to identify a selected mnemonic character within each textual choice and graphic input controls, such as "radio buttons" are then utilized to indicate a selection of a textual choice.

12 Claims, 13 Drawing Sheets

METHOD AND SYSTEM FOR PRESENTATION OF SINGLE AND DOUBLE DIGIT SELECTION FIELDS IN A NON-PROGRAMMABLE TERMINAL

This is a continuation, of application Ser. No. 07/976, 108, filed 13 Nov. 1992, now abandoned.

BACKGROUND OF THE INVENTION

1. Technical Field

The present invention relates in general to computer terminals or workstations which are connected for information interchange with a host or mainframe computer system and in particular to a method and system for presenting selection fields on certain non-programmable terminals by distributing the selection field processing field operation amongst a workstation control interface, a host processor and a non-programmable terminal. Still more particularly, the present invention relates to a method and system for presentation of single and double digit presentation fields in a non-programmable terminal in a manner which simulates graphic user interfaces typically associated with programmable terminals.

2. Description of the Related Art

In a typical prior art system which utilizes a host processor, workstation control interface and multiple non-programmable terminals or workstations, wherein the non-programmable terminals are utilized for user interaction and access and the host processor is utilized for executing application programs, the host processor provides certain fundamental information. For example, the host processor may generate a data stream containing information to be displayed on a non-programmable terminal display screen, and information for controlling the presentation and position of data within the screen. In the case of a programmable workstation, the host processor data stream is sent directly to the workstation and is processed internally within the workstation, which itself contains sufficient internal memory and program data to directly control the interaction with the display screen and keyboard. However, in the case of a non-programmable terminal (NPT), the host processor data stream is typically sent to a workstation controller or workstation controller interface which provides the necessary internal memory and control for directly controlling the display screen of the non-programmable terminal. In either case, the host processor-constructed data stream is received by a workstation controller interface, which may be implemented utilizing hardware and/or software, and the workstation control interface then processes that data stream. A workstation controller then communicates with attached non-programmable terminals to determine whether or not a keystroke should be recognized or whether any of a predetermined number of commands from the workstation controller have been processed.

Although a programmable workstation terminal is of considerably more sophisticated design than a non-programmable terminal, when such a terminal is utilized in an environment wherein the host processor executes application programs and merely utilizes the programmable workstation terminal for non-programmable terminal-like operator/user interface, the programmable workstation terminal suffers from most of the same limitations as a non-programmable terminal. For example, each time a display panel is to be changed on the screen of either type of terminal, as a result of user interaction, the host processor creates the panel description, and presentation, and then constructs a data stream for transmission to the workstation controller interface.

The inherent superiority of the logical design sophistication of a programmable workstation enables the designer to incorporate certain user interface enhancements into a stand-alone programmable workstation application, which enhancements have heretofore been unavailable in systems which utilize non-programmable terminals. One such enhancement, the "selection field," is a widely utilized programmable workstation enhancement, which has heretofore been unable to be utilized in systems which utilize non-programmable terminals due to the inability of the internal logical design capability of a non-programmable terminal to permit the processing operations required. These limitations have forced users of non-programmable terminals to operate under a different and more limited set of interface rules than are available to users of programmable workstation-based applications. However, since a total system environment may include a host processor connected to a significant plurality of mixed workstation environments, a system user must be familiar with both sets of operating rules in order to effectively interface with the application program being executed, through either a programmable terminal or a non-programmable terminal.

The necessity that a system user be knowledgeable of multiple different sets of user interface rules seriously compromises the operational effectiveness of the total system. A dilemma arises from the historically competing demands of increased sophistication and uniformity of operation versus the competitive demands of system costs. The marketplace has created a demand for a low-cost keyboard/display terminals, which has resulted in the widespread use of non-programmable terminal devices. On the other hand, system users have created a demand for increasingly sophisticated and "user-friendly" interactions with applications, which has lead to an increased utilization of the programmable workstation-type terminal devices.

Computer manufacturers, in an effort to satisfy these competing demands, have devised uniform system architecture rules to enable the interconnection and shared usage of both non-programmable terminals and programmable workstation terminals within the same system. To the greatest extent practicable the user interface rules for these mixed systems have been uniformly devised. For example, International Business Machines Corporation has defined a "Systems Application Architecture" (SAA) to layout a common set of rules for system design and interconnection of subsystems. The user interface to the System Application Architecture is also defined, and reference should be made to IBM Publication No. SC26-4351-0, entitled "Common User Access-Panel Design and User Interaction." These Common User Access (CUA) rules define and describe the techniques and conventions which are utilized to enable application designers and developers to create various application software that will operate effectively on a wide variety of different computer systems. Common User Access (CUA) is one part of the IBM Systems Application Architecture (SAA), which is a complete set of selected software interfaces, conventions, and protocols which serves as a common framework for application development, portability, and use on multiple system types. Among the IBM systems to which these rules apply are the System/370, IBM Personal Computers, and the AS/400 System. Common User Access (CUA) rules are uniformly devised, except, as here, where hardware limitations prevent such uniformity.

The present invention overcomes apparent hardware limitations in non-programmable terminal devices to enable the utilization of single and double digit presentation fields in display screen constructs for such devices. U.S. patent application Ser. No. 07/655,880, entitled "Method and Apparatus for Presenting Selection Fields on Non-Programmable Workstations," assigned to the assignee herein, sets forth one technique whereby "selection field" techniques may be utilized within a non-programmable terminal to provide a list of choices from which users may select one or more entries. The selection field is relatively new type of input field, complimenting the conventional entry input field in which data is entered from the keyboard. However, the aforementioned patent application is directed primarily to a method and system whereby a user may select certain display screen items utilizing the keyboard "/" key, space key, numeric keyboard characters, mnemonic keyboard characters, and the enter key. While this represents a substantial advance in the art, this technique does not permit a user to efficiently select one or more entries from a list which exceeds nine entries.

It should therefore be apparent that a need exists for a method and system which permits a user utilizing a non-programmable terminal device to efficiently select entries from a list containing more than nine entries utilizing a technique which simulates graphic interfaces available for utilization with programmable terminal devices.

SUMMARY OF THE INVENTION

It is therefore one object of the present invention to provide an improved data processing system.

It is another object of the present invention to provide an improved method and system for constructing and presenting selection fields in display panel constructs within a non-programmable terminal.

It is yet another object of the present invention to provide an improved method and system for constructing and presenting single and double digit selection in display panel constructs associated with non-programmable terminals.

The foregoing objects are achieved as is now described. The method and system of the present invention permit the presentation of single and double digit selection field in a non-programmable terminal. Multiple numeric characters associated with particular textual choices are coupled to a workstation controller interface along with an identified offset within each textual choice to a selected mnemonic character. If an associated terminal display device does not support more advanced graphic elements, such as so-called "radio buttons" and underscored mnemonics, the numeric characters are entered into a format table entry and utilized to specify a selection field within the terminal display. A single or double digit numeric indicator area is then defined within the terminal display and numeric entries within the selection field are displayed within the numeric indicator area, permitting the user to visually affirm what textual choice will be selected upon entry. A selected textual entry is then displayed utilizing highlighting or reverse video, providing a simulation of graphic entry techniques while permitting direct selection of any textual choice. If an associated terminal supports advanced graphic elements, the offset value is utilized to identify a selected mnemonic character within each textual choice and graphic input controls, such as "radio buttons" are then utilized to indicate a selection of a textual choice.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
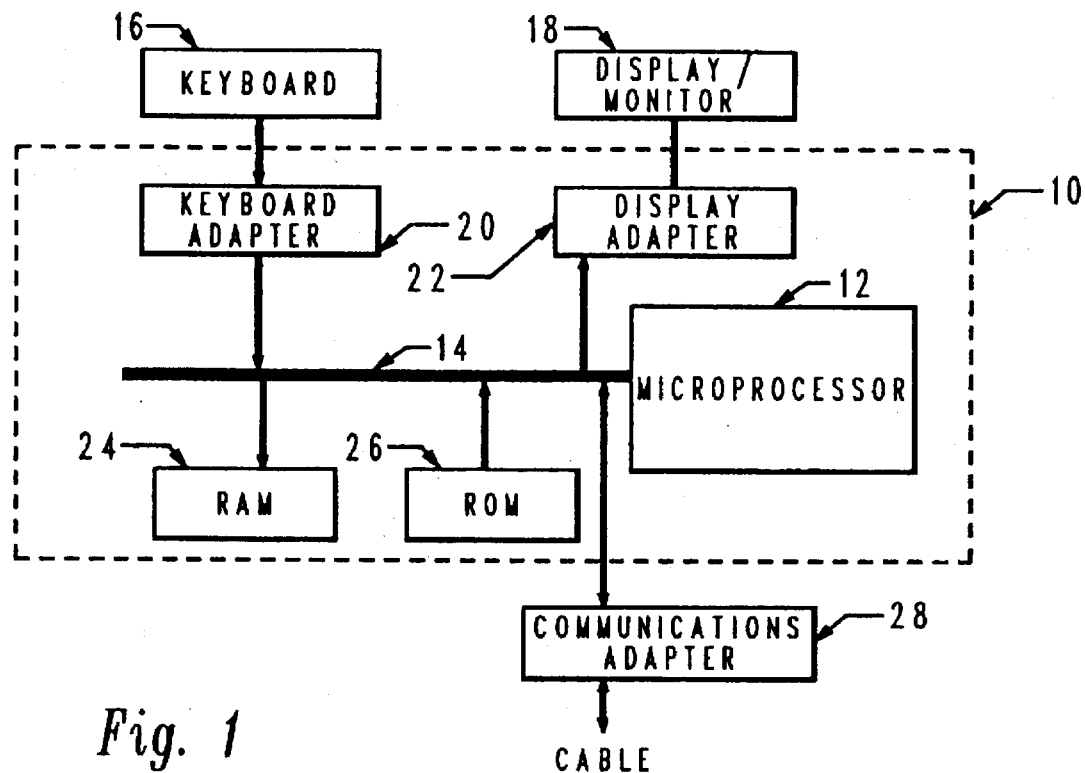
FIG. 1 depicts a high level block diagram of a typical non-programmable terminal.

With reference now to the figures and in particular with reference to FIG. 1, there is depicted a high level block diagram of a typical non-programmable terminal 10 wherein the circuits typically found within such a terminal are illustrated within the framework designated within the dotted outline associated with reference numeral 10. This type of terminal or workstation is also sometimes referred to as a "dependent workstation" or "non-programmable workstation." The microprocessor 12 within non-programmable terminal 10 is typically an Intel type 8088 or 8086 circuit device, or its equivalent, and microprocessor 12 is preferably coupled to an external bus 14 which is connectable to several adapters for enabling communication with a limited number of external devices. For example, a keyboard adapter 20 enables communication between microprocessor 12 and a keyboard 16. Similarly, a display adapter 22 enables information to be transferred to a display/monitor 18 and a communications adapter 28 enables communication between non-programmable terminal 10 and a workstation controller (not shown). Additionally, non-programmable terminal 10 preferably includes Random Access Memory (RAM) 24 which is generally capable of between three and five kilobytes of storage, generally utilized for storing a screen buffer, and for providing a limited amount of memory work area for internal processing. Additionally, Read Only Memory (ROM) 26 is also coupled to external bus 14 and generally includes approximately eight kilobytes of capacity, for storing relating power-on processing, diagnostics, and character generation patterns and process communication protocols for communicating with a workstation controller.

A non-programmable terminal such as non-programmable terminal 10 is generally incapable of any significant internal processing beyond that which is required to interface with keyboard 16 and display/monitor 18, and to communicate via communications adapter 28. Therefore, all of the information (except for diagnostics and set-up information stored within Read Only Memory (ROM) 26) displayed on display/monitor 18 must be provided via communications adapter 28 to Random Access Memory (RAM) 24, and microprocessor 12 will then generate sufficient internal control to display that information within display/monitor 18. Similarly, all keystrokes entered at keyboard 16 are temporarily received within Random Access Memory (RAM) 24, subject to activation of communications adapter 28 for transmission of the keystroke information over a cable to the workstation controller. In a preferred embodiment of the present invention, the non-programmable terminal depicted within FIG. 1 is preferably an International Business Machines 5250 display, although other equivalent types of non-programmable terminals may be utilized, such as ASCII terminals.

In known systems, the function of workstation controller or workstation controller interface is to provide information transfer and control for a plurality of remote non-programmable terminals from a single host processor. This workstation controller function is typically performed by a hardware and software package which is uniquely identified and separate from the host processor hardware and software packages. However, a workstation controller interface may also be implemented utilizing a software application within the host processor. The hardware for a workstation controller is typically contained on a circuit board package which is connectable to a host processor card slot and the software for a workstation controller is generally executed by the hardware independently of software which is executed by the host processor. However, in certain systems, the workstation control interface function of a workstation controller is entirely a software package function, the software being executable within the host processor hardware. The preferred embodiment of the present invention is disclosed with respect to the workstation controller concept which is physically separate from the host processor in both hardware and software details. However, as those skilled in the art will appreciate, the method and system disclosed herein may also be implemented utilizing a workstation control interface which is totally implemented within software.

If a workstation controller is physically remotely positioned from a host processor, its communication with the host processor is typically occurs via a communication line, connected in a manner similar to the connection of various other remotely located devices. If the workstation controller is physically incorporated within the host processor mainframe, the workstation controller may communicate with the host processor utilizing the normal channel connections associated with such processors.

Figure 2:
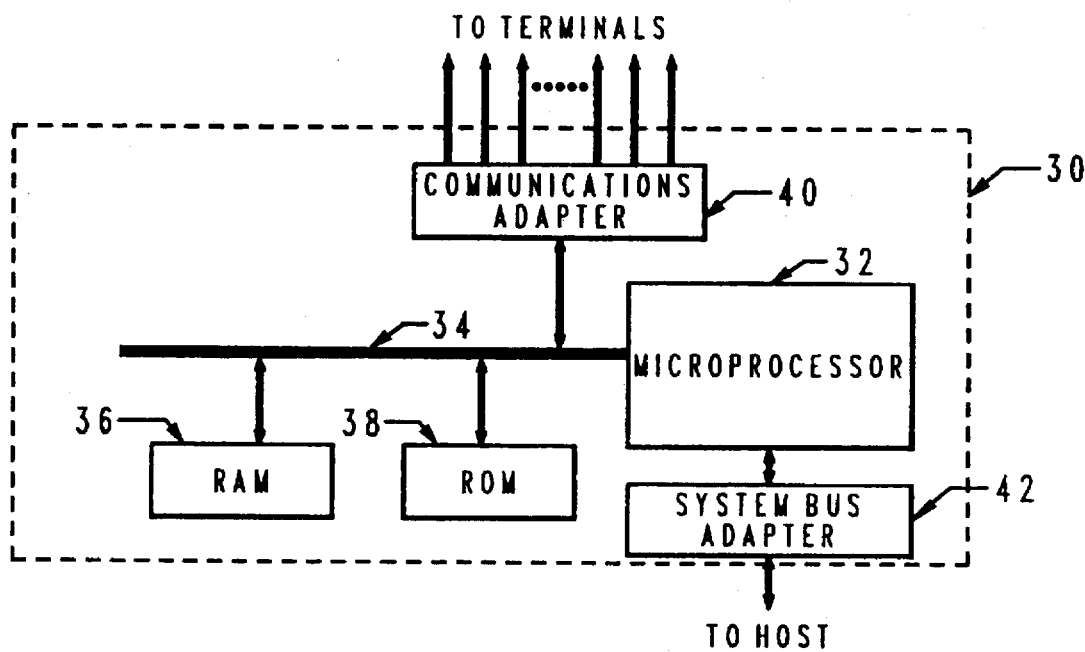
FIG. 2 illustrates a high level block diagram of a typical workstation controller.

Referring now to FIG. 2 there is depicted a high level block diagram of a typical workstation controller, of the type which normally communicates with a plurality of non-programmable terminal devices. Workstation controller 30 typically includes a number of circuits which are contained within a package designated by the dotted outline at reference numeral 30 and a microprocessor 32 is typically provided within a workstation controller 30. Microprocessor 32 is typically an Intel Type 80826 Circuit Chip, or its equivalent. Microprocessor 32 is typically connected to a system bus adapter 42 which itself may communicate with a host computer processor. Workstation controller 30 also typically includes an internal data bus 34 and Random Access Memory (RAM) 36 which generally has a capacity of between 0.5 and 2.0 megabytes. Additionally, Read Only Memory (ROM) 38 is also typically provided having a capacity of approximately sixteen kilobytes, and is utilized to contain coding for initializing the workstation controller and for diagnostics relating to workstation controller 30. Internal data bus 34 of workstation controller 30 is also generally connected to a communications adapter 40, which is externally connected to a fan-out multiplexer for enabling a plurality of non-programmable terminal devices to communicate with a single workstation controller. In a typical application, the fan-out circuits are connectable to up to forty non-programmable terminals. Keystroke signals from all non-programmable terminals which are coupled to a particular workstation controller are received by the workstation controller and stored within Random Access Memory (RAM) 36, for subsequent communication to the host processor or for internal processing by workstation controller 30. In one embodiment of the workstation controller of FIG. 2, workstation controller 30 is implemented as a "feature card" for an International Business Machines AS/400 Computer System, wherein the microprocessor is suitably programmed.

Figure 3:
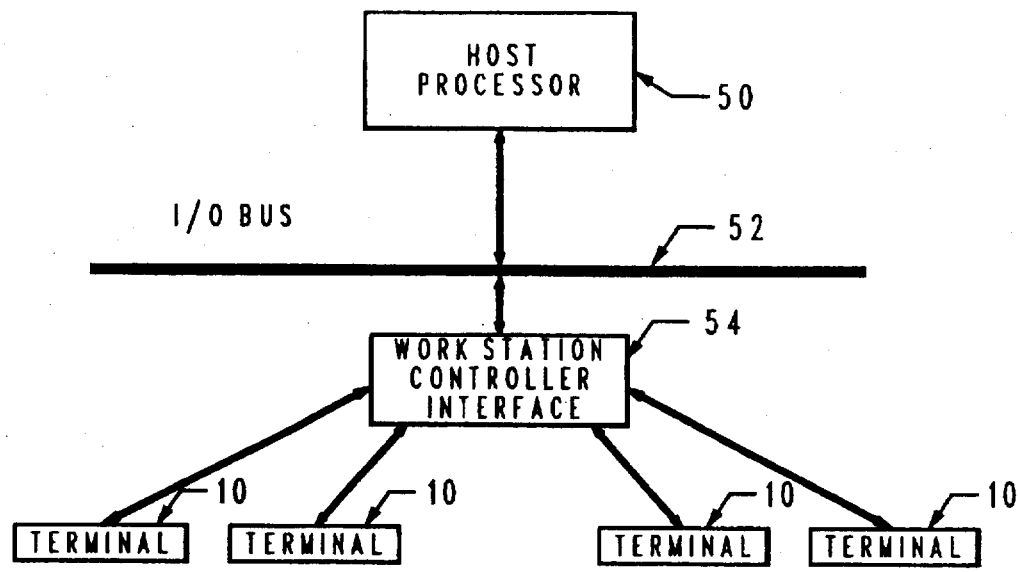
FIG. 3 depicts a high level block diagram of a plurality of non-programmable terminals coupled to a host processor via a workstation controller.

With reference now to FIG. 3, there is depicted a high level block diagram of a plurality of non-programmable terminals coupled to a host processor via a workstation controller. As illustrated, host processor 50 typically communicates with a workstation controller interface 54 via an I/O bus 52. Similarly, workstation controller interface 54 communicates with up to forty non-programmable terminals 10 via various communications cables. Other devices and controllers may also be connected to I/O bus 52 for communication with host processor 50. In one preferred embodiment of the present invention, host processor 50 is part of an International Business Machines AS/400 Computer System.

Under typically operating conditions in the prior art, host processor 50 will generally construct a data stream for each of the terminals to which it is connected, host processor 50 will then transfer a data stream representative of each display panel, and the various screen display field definitions to workstation controller interface 54, where the field definitions are retained and the display panel data is temporarily retained within a section of Random Access Memory (RAM) identifiable with each particular non-programmable terminal. The workstation controller then transfers the display panel data to a specific non-programmable terminal device. Each non-programmable terminal device contains sufficient internal storage to retain the display panel data for purposes of presenting the display panel to the user. If a non-programmable terminal user enters a keystroke, the non-programmable terminal signals the workstation controller that the non-programmable terminal has keystroke data available. The workstation controller then receives the transfer of this keystroke data when polling the non-programmable terminals.

Figure 4:
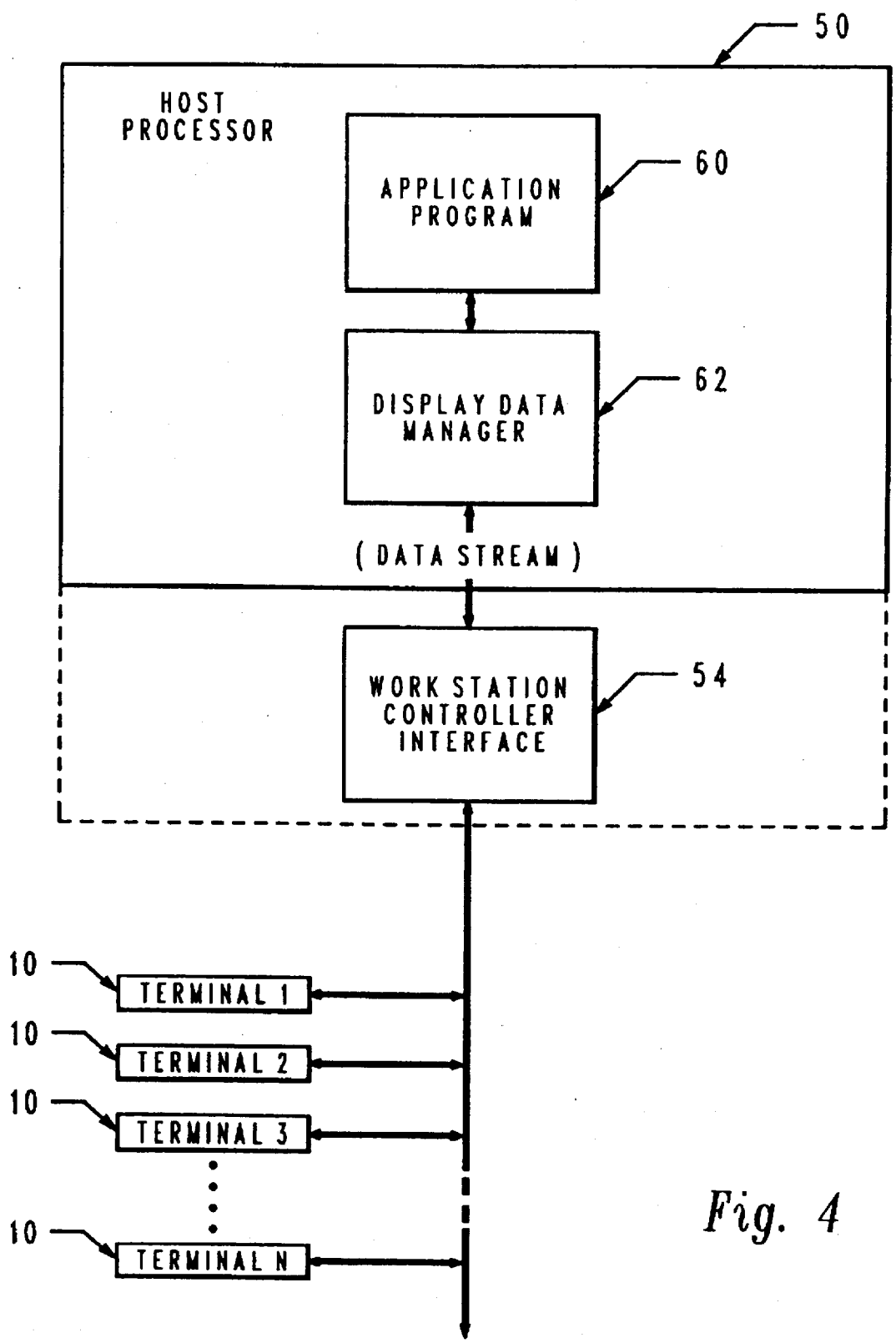
FIG. 4 illustrates a simplified display data flow in a system utilizing non-programmable terminals.

Referring now to FIG. 4, there is depicted a simplified display data flow in a system utilizing non-programmable terminals. As illustrated, host processor 50 is utilized to execute application program 60 as part of its normal operating function. Application programs 60 may communicate, from time to time, with the non-programmable remote terminals connected within the system, either by processing keyboard data sent from the non-programmable terminals or by generating display panel information to be transmitted to the non-programmable terminals for display. When an application program 60 needs to communicate with a remote non-programmable terminal, it typically invokes an application program interface routine, one form of which is identified as a display data manager 62. When information is to be displayed at a remote non-programmable terminal, display data manager 62 constructs a data stream according to a particular format, and transmits this data stream to workstation controller interface 54. The depiction of workstation controller interface 54 generally within the boundaries of host processor 50 is meant to imply the ability of such systems to implement a workstation controller as a separate hardware device or entirely within software within host processor 50. The workstation controller interface 54 then selectively interacts with multiple non-programmable terminals 10, selectively activating the appropriate device and passing the information to be displayed onto the selected non-programmable terminal.

The specific programming requirements for communicating between a workstation control interface and a typical host computer processor, are described in International Business Machines Publication No. SA21-9247-6, entitled "IBM 5250 Information Display System-Functional Reference Manual." This information is incorporated herein by reference thereto, as a disclosure of the required programming formats and data interchange. However, in addition to the disclosure therein, the present invention requires implementation of additional processes which may be incorporated into the software of the workstation controller interface. In particular, the present invention is useful in presenting single and double digit selection fields within non-programmable terminals in a manner not heretofore available, and thereby improving the usability of such devices in terms of user interaction with selection fields in non-programmable terminals.

Figure 5:
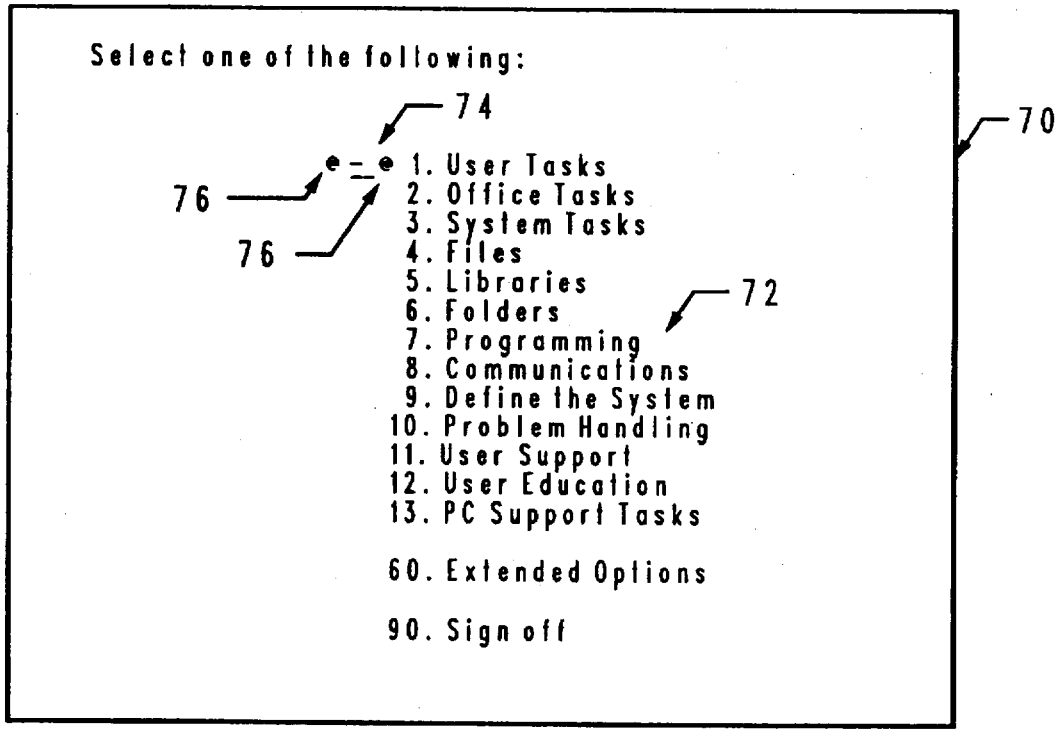
FIG. 5 depicts a pictorial representation of a terminal display screen illustrating selection of a textual choice from a list of greater than nine, such choices in accordance with the prior art.

With reference now to FIG. 5 there is depicted a pictorial representation of a terminal display screen 70 which illustrates selection of a textual choice from a list of greater than nine such choices in accordance with the prior art. As illustrated, terminal display screen 70 includes a list of textual choices 72. As is typical within such non-programmable terminal devices an entry field 74 is provided. Entry field 74 is defined by delimiters 76, depicted as the "@" character. A two place entry field 74 is illustrated, including a one position text cursor disposed therein. A user may, upon placing the display cursor within entry field 74 type a single or double digit numerical character which is representative of a particular one of the textual choices listed within terminal display screen 70. Thus, when utilizing the selection method depicted within FIG. 5, a user simply enters one or two numeric characters and then selects the "Enter" key to implement the selection. Therefore, the number of keystrokes required to select a textual choice is either two or three. While this technique is fairly efficient, modern data processing systems continue to utilize Graphic User Interfaces (GUI), such as windows, action bars, pull-downs and selection fields. Such enhanced user interfaces greatly increase the apparent "user-friendliness" of a terminal and it is therefore desirable to incorporate such an interface within a non-programmable terminal. However, most current non-programmable terminals do not include pointing devices and are typically unable to provide mnemonic support as a result of the inability of such character driven display systems to provide underscore for the single character mnemonics.

Figure 6:
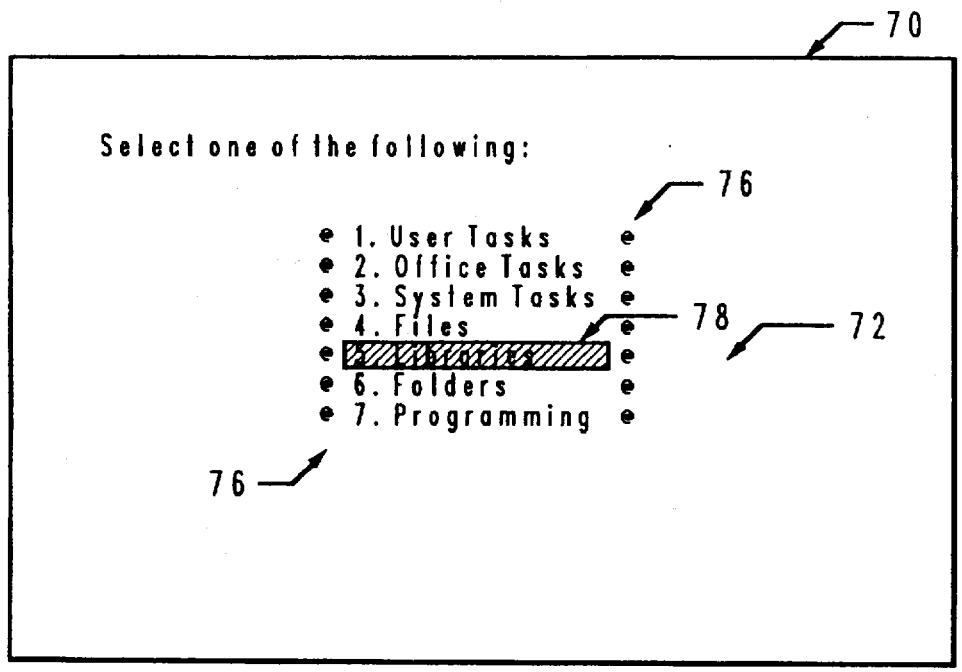
FIG. 6 illustrates a pictorial representation of a terminal display screen depicting a simulated graphic selection of a textual choice from a list of less than ten such choices in accordance with the prior art.

Referring now to FIG. 6 there is illustrated a pictorial representation of a terminal display screen 70 which depicts a simulated graphic selection of a textual choice from a list of less than ten such choices in accordance with the prior art. As illustrated within the terminal display screen 70 of FIG. 6, a plurality of textual choices 72 are depicted. As above, each textual choice within textual choices 72 is enclosed within a delimiter 76, depicted as the "@" character. The left and right delimiters for each selection field choice bound that selection field choice and may be utilized to depict current selection cursor position. This is generally accomplished utilizing a reverse image bar or a high intensity display as indicated at reference numeral 78. Upon initializing such a system, the selection cursor is generally placed as a default position at the first choice and there is no text cursor provided within a programmable terminal like selection field. Cursor up and down keys are utilized to move the selection cursor within the selection field bounded by delimiters 76 or, the entry of a valid number by the user utilizing the numeric keys can be utilized to move the selection cursor to a numbered choice. Thus, textual choice 5 may be selected utilizing the prior art system depicted within FIG. 6 by moving the cursor physically down to entry 5 or by typing the single number 5.

This display panel has a programmable terminal like user interface and is fairly efficient; however, for a menu or a single choice selection field which includes greater than nine choices, numeric selection is not defined in such system. The converting of an entry field menu which includes more than nine choices to a simulated programmable terminal selection field is typically accomplished as depicted within FIG. 7.

Figure 7:
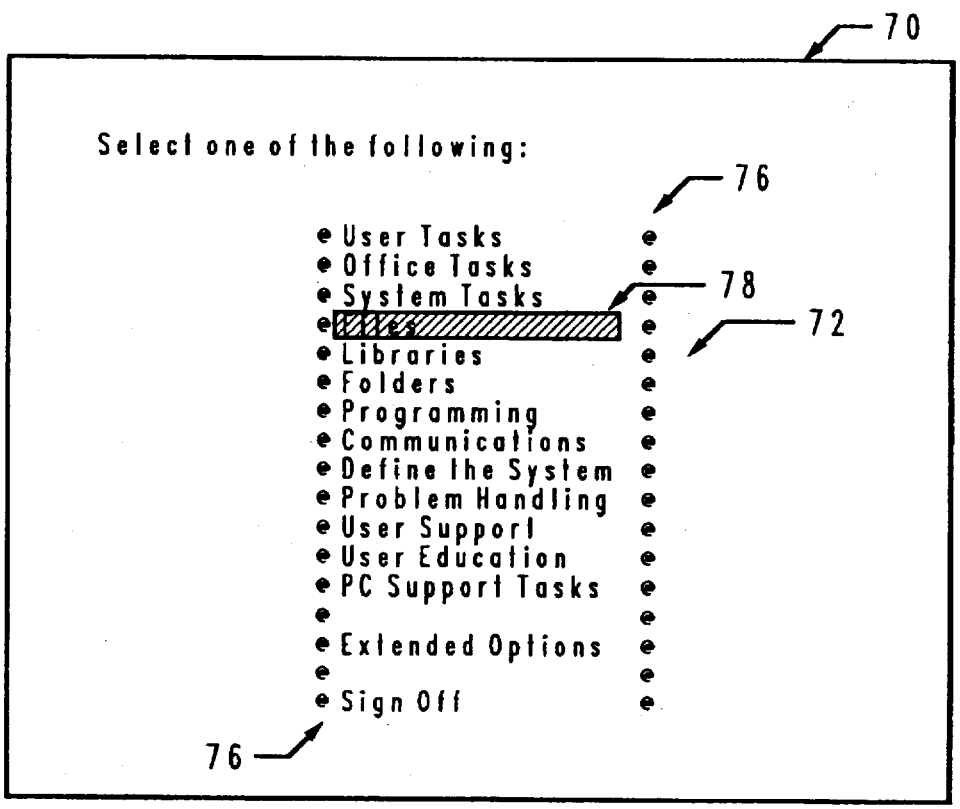
FIG. 7 depicts a pictorial representation of a terminal display screen depicting a simulated graphic selection of a textual choice from a list of greater than nine such choices in accordance with the prior art.

FIG. 7 illustrates a pictorial representation of a terminal display screen 70, which illustrates a simulated graphic selection of a textual choice from a list of greater than nine such choices in accordance with the prior art. As illustrated within FIG. 7, the list of textual choices 72 is bound on either side by delimiters 76 in the manner described above. The inability of such systems to accommodate double digit selection fields is avoided by the elimination of numeric characters associated with each textual choice and the only selection method provided is cursor selection. That is, moving the selection cursor to a choice which is then highlighted, as indicated at reference numeral 78 and pressing the "Enter" key. Such systems are highly inefficient in view of the fact that a cursor must be sequentially moved from the top of the list of textual choices 72 to the bottom of the list in single move sequences. Thus, the cursor down key must be depressed thirteen times in order to permit the user to select the "Extended Options" menu choice when utilizing this technique.

Figure 8A:
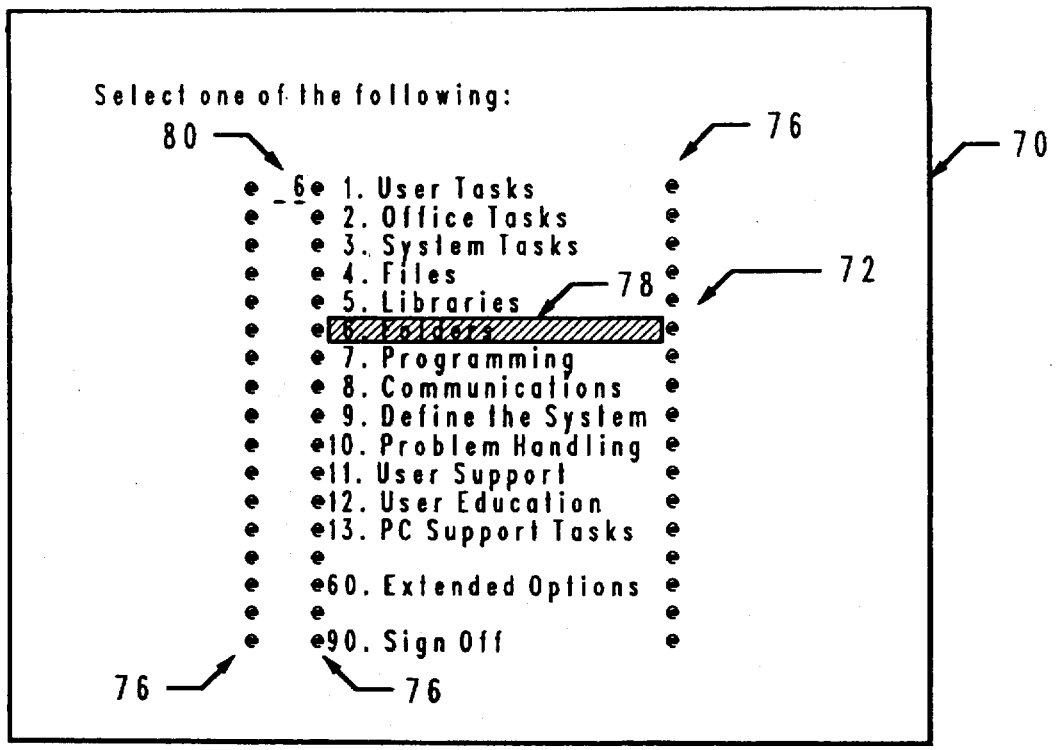
FIGS. 8a and 8b illustrate a pictorial representation of a terminal display screen depicting a simulated graphic selection of a textual choice from a list of greater than nine such choices in accordance with the method and system of the present invention.
Figure 8B:
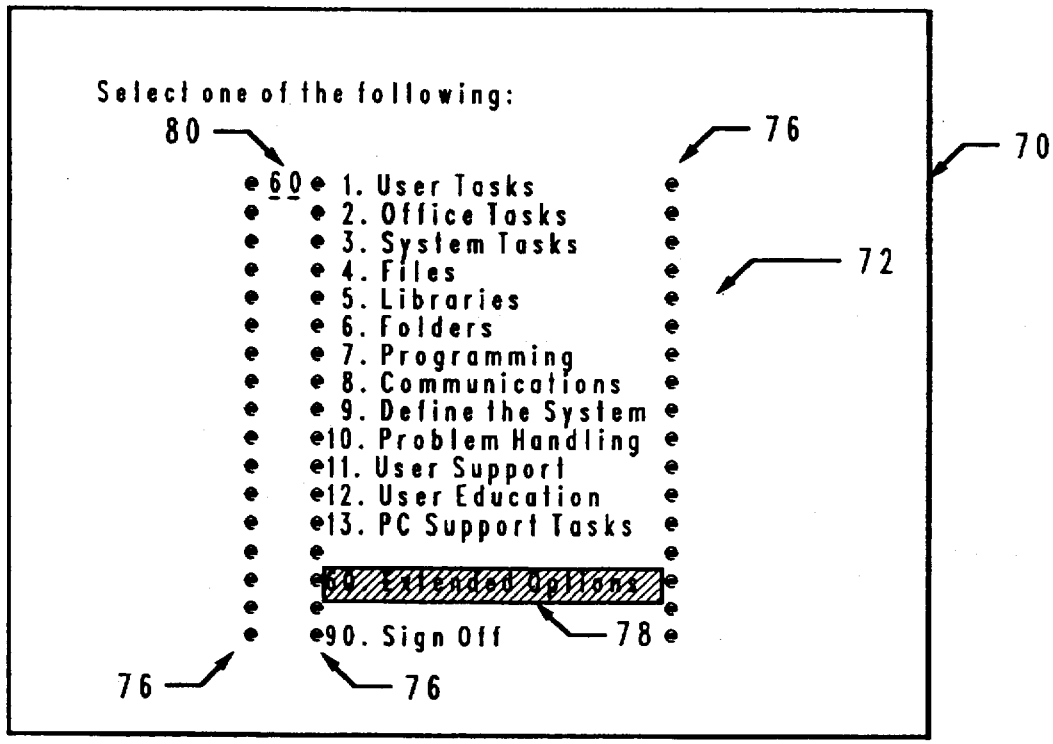

Referring now to FIGS. 8a and 8b, there is illustrated a pictorial representation of a terminal display screen 70 which depicts a simulated graphic selection of a textual choice from a list of greater than nine such choices in accordance with the method and system of the present invention. As illustrated, a plurality of textual choices 72 are displayed within terminal display screen 70. Again, a plurality of delimiters 76 are utilized to bound each textual choice within textual choices 72 and, in accordance with an important feature of the present invention, a numeric indicator area 80 is also provided. Thereafter, in accordance with the method and system of the present invention and in a manner which will be explained in greater detail herein, the presence of the cursor within the selection field formed by delimiters 76 will permit the user to enter a single or double digit numeric character associated with a particular textual choice within terminal display screen 70. Indicator field 80 is utilized to provide the user with visual affirmation of the entry selected and, in manner which will be explained in greater detail below, permits the user to select a particular textual choice directly, without the need for extensive cursor manipulation. As depicted within FIG. 8a, the user has entered the numeric character "6" within the selection field defined by delimiters 76. A "6" is therefore depicted within numeric indicator area 80. In accordance with the method and system of the present invention, delimiters 76 on either side of textual choice "6" are utilized to highlight the selection utilizing reverse video or high intensity display as indicated at reference numeral 78, in a manner well known to those having skill in the art.

Subsequently, as depicted within FIG. 8b, the entry by the user of a second numeric character, such as "0" permits the user to directly access textual choice "60" from textual choice "6" upon selection of the "Enter" key or other techniques which will be explained in greater detail herein. The numeric character or characters associated with a particular textual choice within terminal display screen 70 is then depicted within numeric indicator area 80 and utilized to provide visual affirmation to the user that a particular textual choice will be selected upon entry of the appropriate keystrokes. As depicted in FIG. 8b, textual choice "60" has been highlighted utilizing reverse image or increased intensity as indicated at reference numeral 78, to indicate the selection of that textual choice utilizing the method and system of the present invention.

Figure 9:
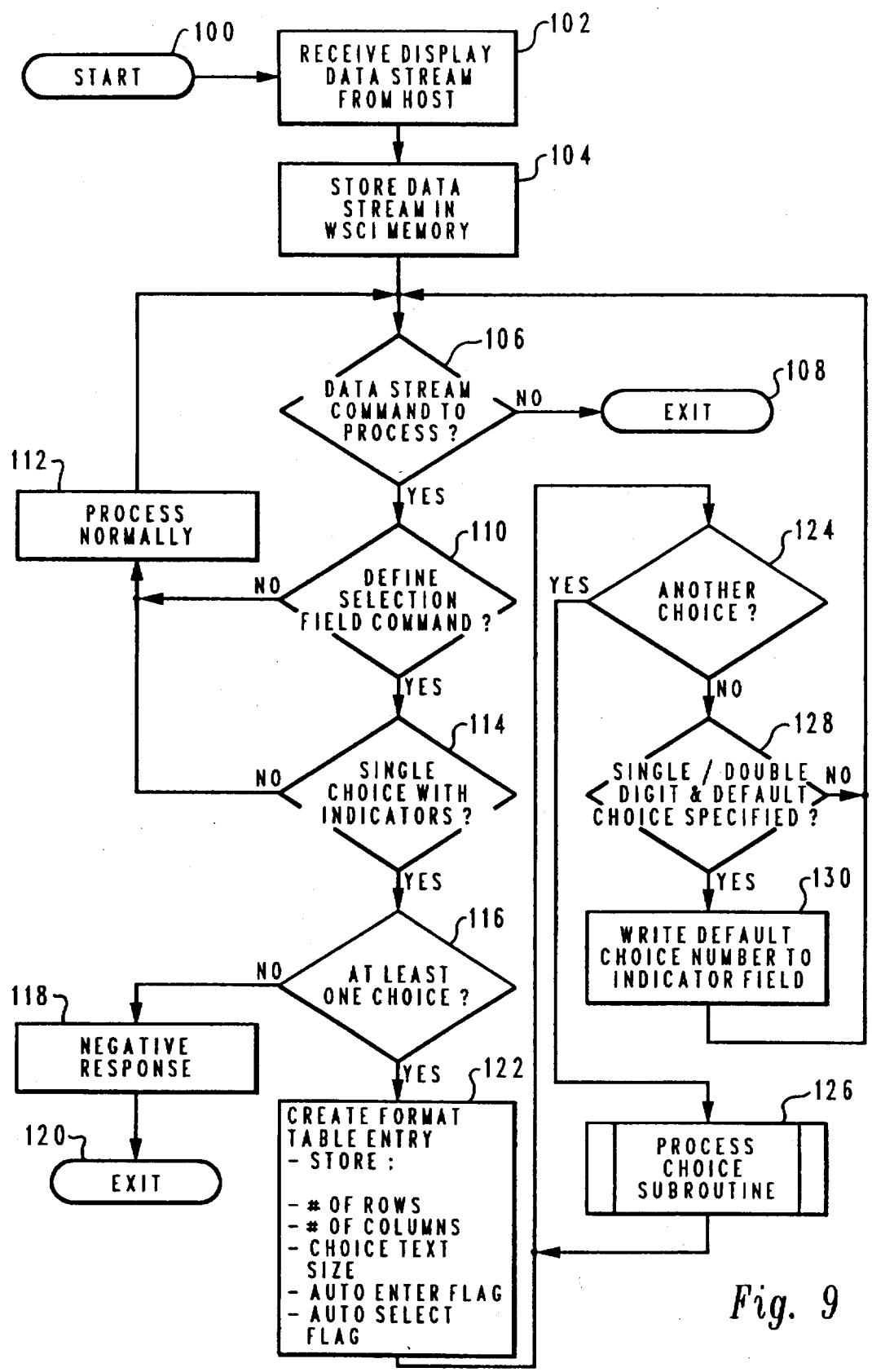
FIG. 9 is a high level logic flowchart illustrating the establishment of a single and double digit presentation field within a workstation controller in accordance with the method and system of the present invention.

With reference now to FIG. 9 there is depicted a high level logic flowchart which illustrates the establishment of a single and double digit presentation field within a workstation controller in accordance with the method and system of the present invention. As depicted, the process begins at block 100 and thereafter passes to block 102. Block 102 illustrates the receiving of a display data stream from the host processor, in a manner described above. Thereafter, the process passes to block 104. Block 104 illustrates the storing of the displayed data stream within the workstation controller memory, as described above.

Next, the process passes to block 106. Block 106 illustrates a determination of whether or not a data stream command is included within the display data stream for processing. If not, the process passes to block 108 and exits, as illustrated. Still referring to block 106, in the event the displayed data stream includes a data stream command to be processed, the process passes to block 110. Block 110 illustrates a determination of whether or not the data stream command defines a selection field command. If not, the process passes to block 112 which illustrates the processing of that data stream command in a normal fashion and then the process returns to block 106 and continues in an iterative fashion.

Still referring to block 110 in the event the data stream command to be processed defines a selection field command, the process passes to block 114. Block 114 illustrates a determination of whether or not the defined selection field command constitutes a single choice selection field with indicators. If not, the process again returns to block 112 which illustrates the processing of that selection field command in a normal fashion and the process then returns to block 106 in an iterative fashion.

Still referring to block 114, in the event the define selection field command to be processed is a single choice, selection field with indicators, the process passes to block 116. Block 116 illustrates a determination of whether or not at least one choice is provided, and if not, the process passes to block 118 which depicts a negative response to the defined selection field command and the process then exits, as depicted at block 120. Alternately, in the event the single choice selection field command within indicators includes at least one choice, the process passes to block 122. Block 122 illustrates the creation of a format table entry within memory in the workstation controller and the storing within that format table entry of the number of rows, the number of columns, the choice text size and the state of the auto enter flag and the auto select flag. Thereafter, the process passes to block 124.

Block 124 illustrates a determination of whether or not another choice within the list of textual choices is present for processing and if so, the process passes to block 126. Block 126 illustrates the process choice subroutine which will be described in greater detail with respect to FIG. 10. Thereafter, the process returns in an iterative fashion to block 124 until such time as no additional choices remain to be processed. Next, the process passes to block 128. Block 128 illustrates a determination of whether or not a single/double digit presentation field has been specified with a default choice. If not, the process returns to block 106 to continue to process data stream commands in an iterative fashion. However, in the event a default choice has been specified, the process passes to block 130. Block 130 illustrates the writing of the default choice number to the numeric indicator area, setting forth the default choice which will be selected upon the initial display of the display panel including the textual choices thus processed. Thereafter, the process, returns to block 106 in an iterative fashion.

Figure 10:
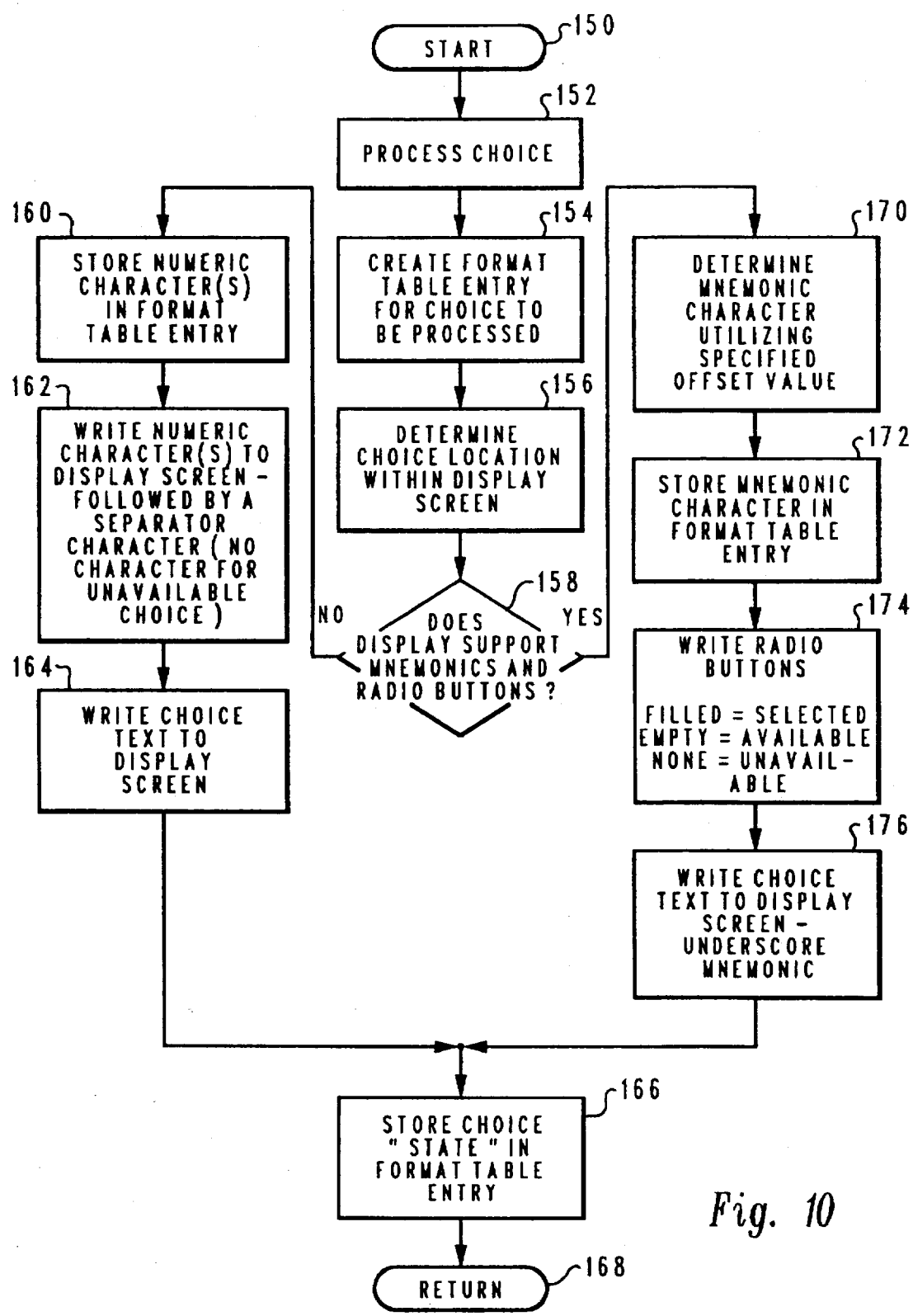
FIG. 10 is a high level logic flowchart illustrating the establishment of multiple textual choices within a terminal display screen in accordance with the method and system of the present invention.

Referring now to FIG. 10 there is depicted a high level logic flowchart which illustrates the establishment of multiple textual choices within a terminal display screen in accordance with the method and system of the present invention. As depicted, this process begins at block 150 and thereafter passes to block 152. Block 152 illustrates the processing of a particular choice within the selection field. This is accomplished as the process passes to block 154. Block 154 illustrates the creation of a format table entry for the particular choice to be processed. Next, the process passes to block 156. Block 156 illustrates the determination of the textual choice location within the display screen.

Next, in accordance with an important feature of the present invention, block 158 illustrates a determination of whether or not the display screen in question supports mnemonics and radio buttons. Those skilled in the art will appreciate that while character based non-programmable terminals typically do not support graphic display elements such as radio buttons and underscore mnemonics, certain enhanced non-program terminals have been announced which will support such remedial graphic elements. In accordance with the method and system of the present invention the display data stream generated by the host processor may include both a numeric character associated with a particular textual choice and an offset within the textual choice to a particular character which has been specified as the mnemonic for that textual choice. In the event the display does not support these remedial graphic elements, the offset to the particular mnemonic character is simply ignored. However, as will be described in greater detail herein, the offset to the mnemonic character may be utilized to provide an even greater enhancement to the presentation field provided in accordance with the method and system of the present invention.

Still referring to block 158, in the event the terminal display screen does not support mnemonics and radio buttons, the process passes to block 160. Block 160 illustrates the storing of the numeric character or characters associated with a particular textual choice in the format table entry maintained at the workstation controller interface. Next, the process passes to block 162. Block 162 illustrates the writing of the numeric character or character or characters to the display screen followed by a separator character such as a ".". It should be noted that no character will be written to the display screen for a choice which has been designated as unavailable. Thereafter, the process passes to block 164. Block 164 illustrates the writing of the choice text to the display screen.

Next, the process passes to block 166. Block 166 illustrates the storing of the choice "state" within the format table entry. Those skilled in the art will appreciate that a textual choice may have three states within a typical non-programmable terminal display. That is, the choice may be "selected," "available," or "unavailable." Thus, the state for a particular choice at a particular time must be stored within the format table entry in order to permit the state of that choice to be displayed within the non-programmable terminal display. Thereafter, the process passes to block 168 and returns.

Referring again to block 158, in the event the terminal display screen does support underscored mnemonics and radio buttons, the process passes from block 158 to block 170. Block 170 illustrates the determination of the mnemonic character utilizing the specified offset value within the textual choice field which has been provided by the host processor. The process then passes to block 172. Block 172 depicts the storing of the mnemonic character in the format table entry. Next, block 174 illustrates the writing of the radio buttons to the terminal display in one of three possible states. A "filled" radio button indicates that a particular choice has been selected an "empty" radio button indicates that a particular choice is available and no radio button is provided for those choices which are not available. Thereafter, the process passes to block 176. Block 176 illustrates the writing of the choice text to the display screen and the underscoring of the mnemonic character within the choice text. Thereafter, as described above, the process passes to block 166, which depicts the storing of the choice "state" within the format table entry and the process then returns, as depicted at block 168.

Figure 11:
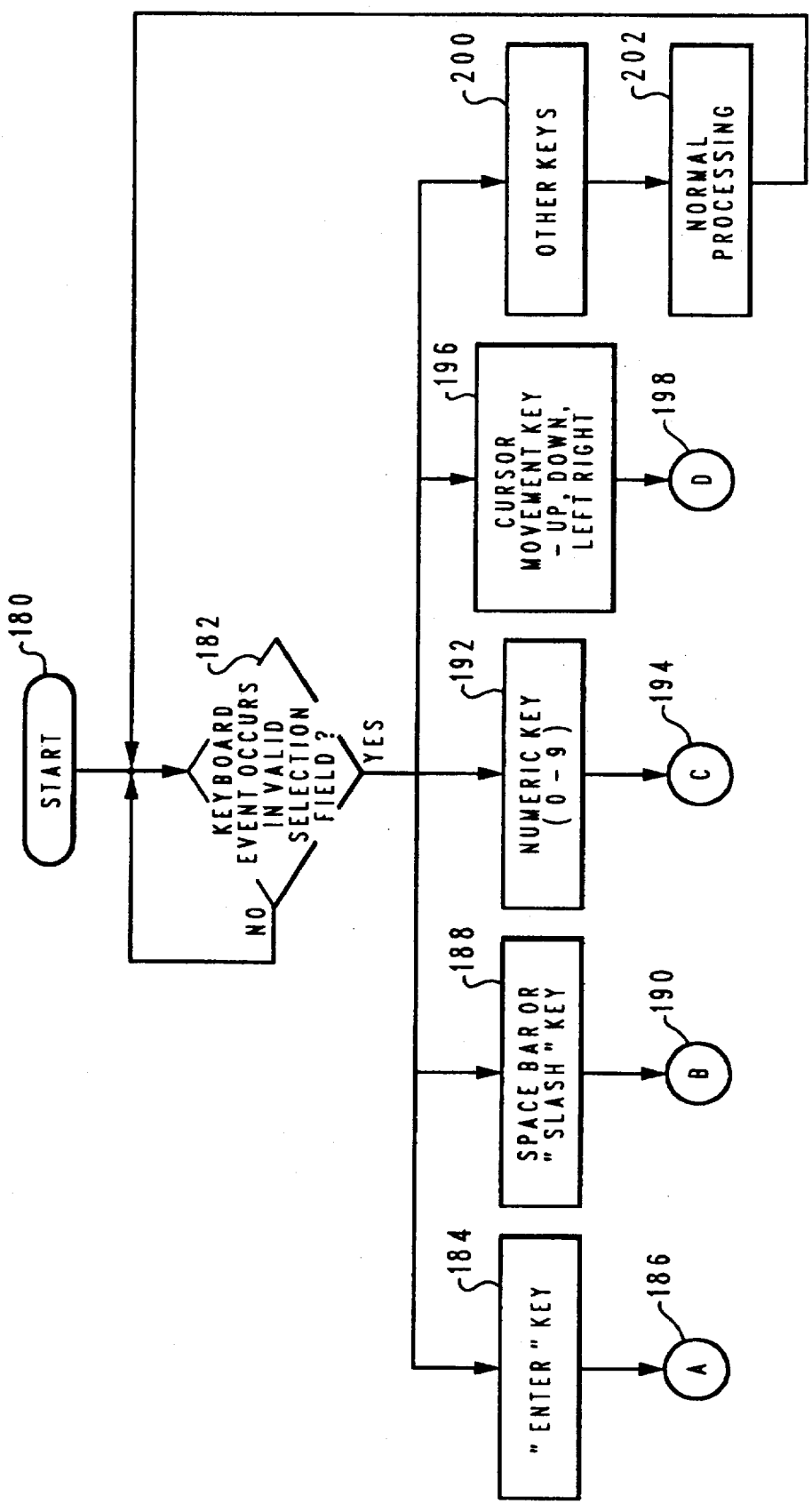
FIG. 11 is a high level logic flowchart illustrating the processing of keyboard events at a non-programmable terminal in accordance with the method and system of the present invention.

With reference now to FIG. 11, there is depicted a high level logic flowchart which illustrates the processing of keyboard events at a non-programmable terminal in accordance with the method and system of the present invention. As illustrated, this process begins at block 180 and thereafter passes to block 182. Block 182 illustrates a determination that a keyboard event has occurred within a valid selection field. If not, the process merely iterates until such time as such a keyboard event occurs. In the event a keyboard event has occurred within a valid selection field the process then passes to either block 184, 188, 192, 196 or 200. As depicted within FIG. 11, the process will pass to block 184 if the keyboard event comprises a "Enter" key selection. Similarly, the process will pass to block 188 in the event the keyboard event comprises a space bar or "slash" key event. In like manner, the process passes to block 192 in the event the keyboard event comprises the entry of a numeric key. The process will pass to block 196 in the event the keyboard event comprises a cursor movement key, such as up, down, left or right and finally, the process passes to block 200 in the event the keyboard event comprises any other key within the non-programmable terminal keyboard. In the event a non-specified keyboard event occurs, the process passes to block 202 which indicates the normal processing of those keystrokes and the process then returns, in an iterative fashion, to block 182 to await the occurrence of a keyboard event within a valid selection field.

As described above, keyboard events may occur as one of four special types. Each of these types then invokes a particular process, as depicted at connector blocks 186, 190, 194, and 198.

Figure 12:
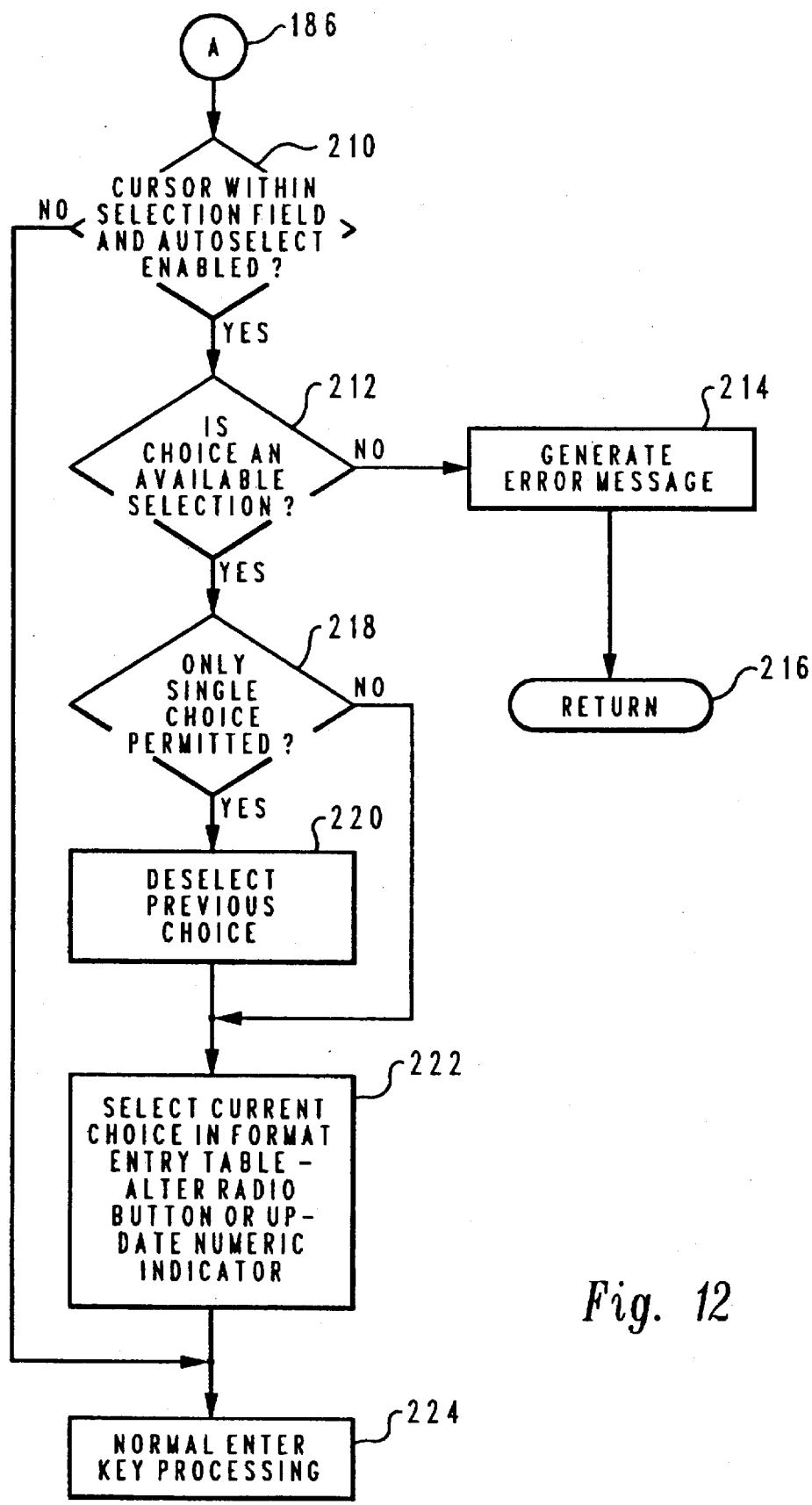
FIG. 12 is a high level logic flowchart illustrating the processing of an "Enter" key selection at a non-programmable terminal in accordance with the method and system of the present invention.

Referring now to FIG. 12, there is depicted the process which occurs upon the occurrence of the selection of an "Enter" key within a valid selection field. As depicted, the process begins at connector block 186, and thereafter passes to block 210. Block 210 illustrates a determination of whether or not the cursor is within a selection field and the auto select function is enabled. If not, the process passes to block 224 which illustrates the normal processing of that keyboard event. Still referring to block 210, in the event the cursor is within a valid selection field and auto select has been enabled, the process passes to block 212. Block 212 illustrates a determination of whether or not the textual choice indicated by the cursor position is an available selection and if not, the process passes to block 214. As described above, certain textual choices may not be available in a particular situation and the attempted selection of a non-available choice will generate an error message, as depicted at block 214. Thereafter, the process passes to block 216 and returns.

Referring again to block 212, in the event the selected choice is an available selection, the process passes to block 218. Block 218 illustrates a determination of whether or not only a single choice is permitted. Those skilled in the art will appreciate that listings of textual choices exists wherein the user may select multiple choices. In the event only a single choice is permitted, the process passes to block 220 which depicts the deselection of the previous choice. This occurs since only a single choice will be permitted under such circumstances. After deselecting the previous choice, as depicted at block 220, or after determining that multiple choices are permitted, as depicted at block 218, the process passes to block 222.

Block 222 illustrates the selection of the current choice within the format entry table and the alteration of the associated radio button or updating of the numeric indicator within numeric indicator area 80 (see FIGS. 8a and 8b). Thereafter, the process passes to block 224 which depicts normal enter key processing.

Figure 13:
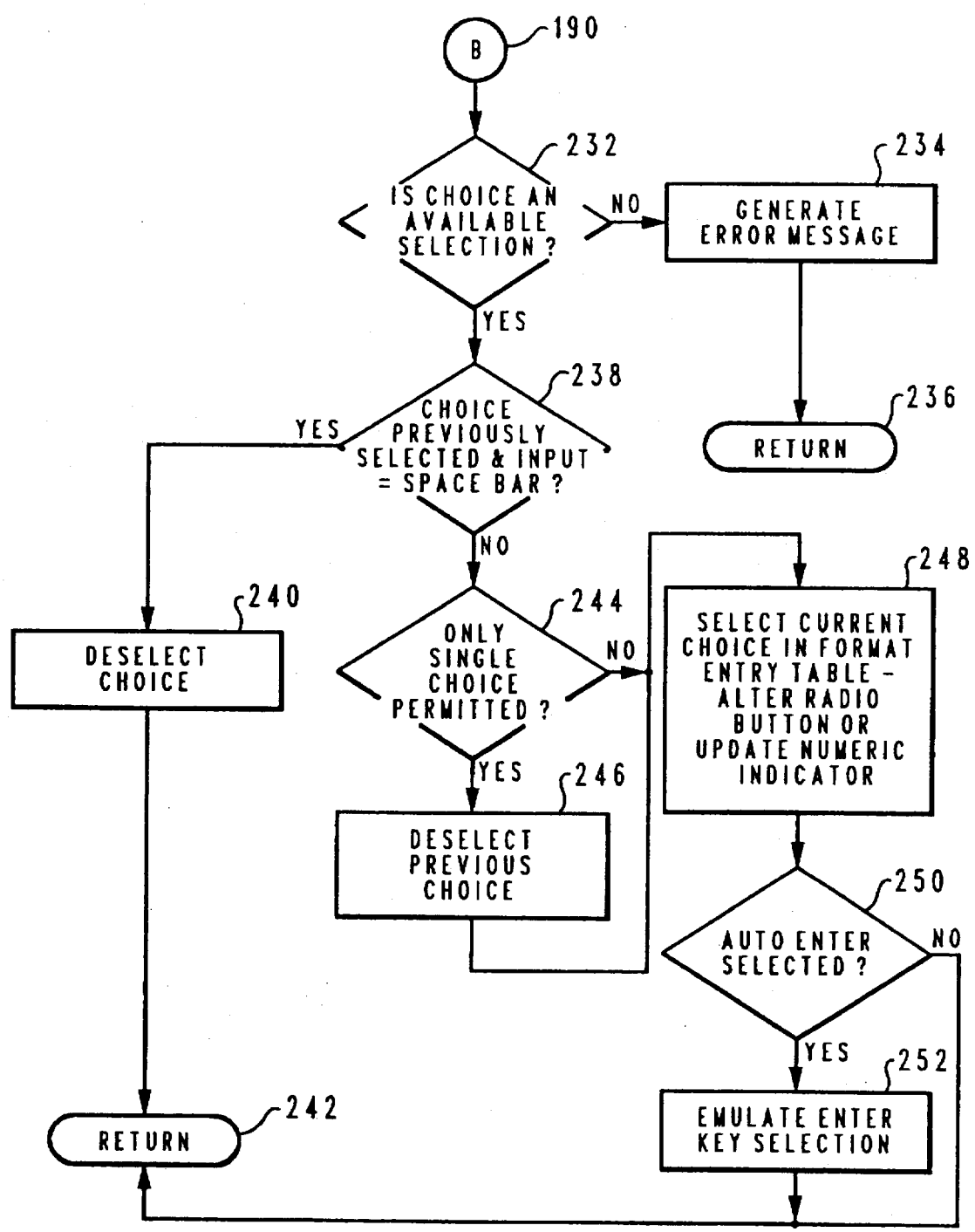
FIG. 13 is a high level logic flowchart illustrating the processing of a space bar or "Slash" key selection at a non-programmable terminal in accordance with the method and system of the present invention.

With reference now to FIG. 13, there is depicted a high level logic flowchart chart which illustrates the processing of a space bar or "Slash" key selection at a non-programmable terminal in accordance with the method and system of the present invention. As those skilled in the art will appreciate in systems in which the cursor may be relocated utilizing cursor movement keys, the space bar is often utilized as a selection toggle entry. Additionally, the "slash" key may also be utilized to select a particular entry. As described above, this process begins at connector block 190 from FIG. 11, and thereafter passes to block 232. Block 232 illustrates a determination of whether or not the selected choice is an available selection. As described with respect to FIG. 12, in the event the selected choice is not available, the process passes to block 234 which depicts the generation of an error message. Thereafter, the process passes to block 236 and returns.

Still referring to block 232, in the event the selected choice is available, the process passes to block 238. Block 238 illustrates a determination of whether or not the choice has previously been selected and the input is a space bar event. As described above, the space bar serves as a toggle key in many systems and the occurrence of a space bar keyboard event within a choice which has been previously selected will serve to deselect that choice, as depicted at block 240. Thereafter, the process passes to block 242 and returns.

Referring again to block 238, in the event the keyboard event is not a space bar selection at a previously selected choice the process passes to block 244. Block 244 illustrates a determination of whether or not only a single choice is permitted. As described above, in the event only a single choice is permitted, the process passes to block 246 which illustrates the deselection of the previous choice. Thereafter, or in the event multiple choices are permitted, the process passes to block 248.

Block 248 illustrates the selection of the current choice within the format entry table and the altering of the associated radio button or the updating of the numeric indicator within numeric indicator area 80 (see FIGS. 8a and 8b). Thereafter, the process passes to block 250. Block 250 illustrates a determination of whether or not the auto enter feature has been selected and if so, the process passes to block 252. Block 252 illustrates the emulation of the Enter key selection and the process then passes to block 242 and returns. Alternately, in the event the auto enter feature is not selected, the process passes to block 242 and returns.

Figure 14A:
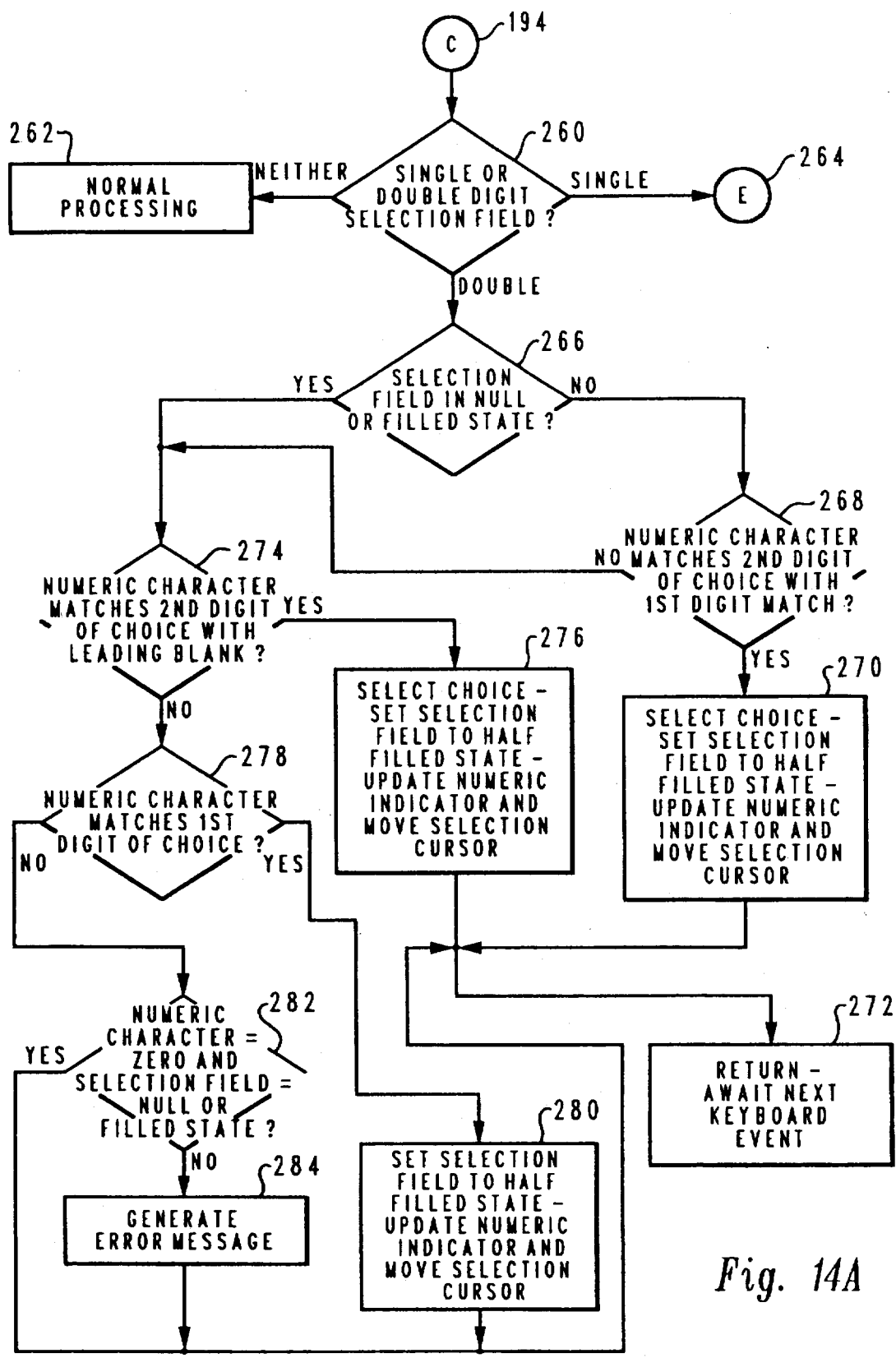
FIGS. 14a and 14b form a high level logic flowchart illustrating the processing of numeric key selections at a non-programmable terminal in accordance with the method and system of the present invention.
Figure 14B:
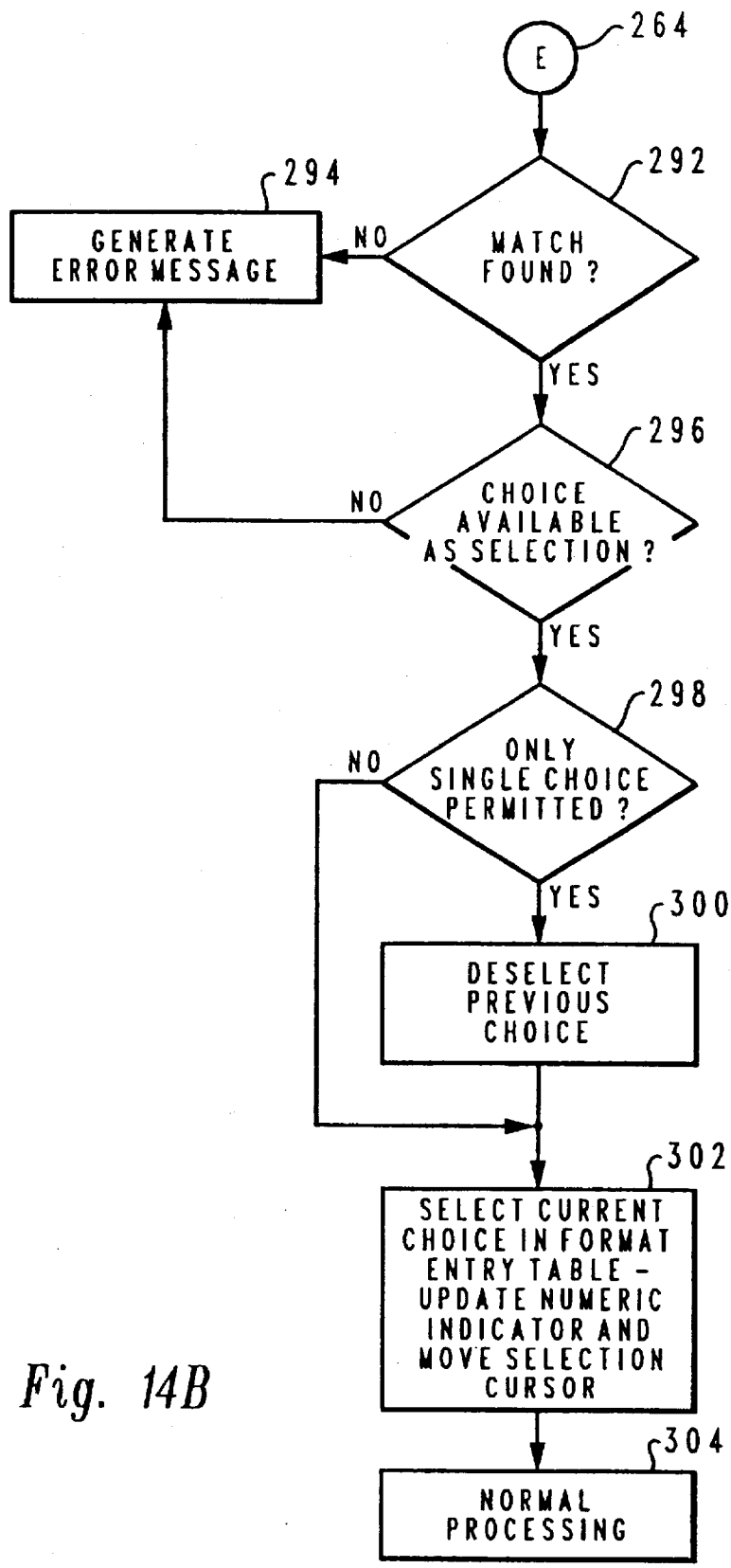

Referring now to FIGS. 14a and 14b, there is depicted a high level logic flowchart which illustrates the processing of numeric key selections at a non-programmable terminal in accordance with the method and system of the present invention. As illustrated, this process begins at connector 194 and thereafter passes to block 260. Block 260 illustrates a determination of whether or not a single or double digit selection field is provided in accordance with the method and system of the present invention. If a single digit selection field is provided, the process passes, via connector 264 to the process depicted within FIG. 14b, as will be described in greater detail herein. Alternately, if neither a single nor double digit selection field is to be presented the process passes to block 262 which illustrates the normal processing of keyboard events.

Still referring to block 260, in the event a double digit selection field is to be presented, the process passes to block 266. Block 266 illustrates a determination of whether or not the selection state within numeric indicator area 80 is in the null or filled state. If not, the process passes to block 268. Block 268 illustrates a determination of whether or not the numeric character keyboard event matches the second digit of a choice which has previously had a first digit match, scanning from top to bottom in the selection list. If so, the process passes to block 270. Block 270 illustrates the selection of that choice from the format entry table, the setting of the selection field to the half-filled state, the updating of the numeric indicator and the movement of the selection cursor, indicating the selection of that choice. Thereafter, the process passes to block 272 to return and await the occurrence of the next keyboard event.

Referring again to block 266, in the event the selection field is not in a null or filled state, or in the event the numeric character does not match the second digit of a choice which has previously had a first digit match, the process passes to block 274. Block 274 illustrates a determination of whether or not the numeric character entered at the keyboard matches the second digit of a choice with a leading blank. If so, the process passes to block 276. Block 276 illustrates the selection of that choice, the setting of the selection field to the half-filled state, the updating of the numeric indicator and the movement of the selection cursor. Thereafter, the process passes to block 272 to return and await the occurrence of the next keyboard event.

Still referring to block 274, in the event the numeric character does not match the second digit of a choice with a leading blank, the process passes to block 278. Block 278 illustrates a determination of whether or not the numeric character matches the first digit of a valid choice. If so, the selection field is set to the half-filled state, the numeric indication is updated and the selection cursor is moved, as depicted at block 280, and the process again returns to block 272 to return and await the occurrence of the next keyboard event.

Still referring to block 278, in the event the numeric character entered at the keyboard event does not match the first digit of a valid choice, the process passes to block 282. Block 282 illustrates a determination of whether or not the numeric character is a zero and the selection field is in a null or filled state and if so, the process passes to block 272 to return and await the occurrence of the next keyboard event. Alternately, in the event the numeric character entered at the keyboard is not a zero, the process passes to block 284. Block 284 illustrates the generation of an error message, indicating that the numeric character entered does not match the first or second digit of a valid selection and the process then passes to block 272 to return and await the occurrence of the next keyboard event.

Now referring to FIG. 14b, there is depicted a high level logic flowchart which illustrates the processing of a single digit selection field in accordance with the method and system of the present invention. As depicted, the process begins at connector 264 and thereafter passes to block 292 to determine if a match has been found. In the event no match has been found, as determined at block 292, the process passes to block 294 which illustrates the generation of an error message. Still referring to block 292, in the event a match is found, the process passes to block 296. Block 296 illustrates a determination of whether or not the selected choice is available as a selection. If not, the process again returns to block 294 which depicts the generation of an error message.

Still referring to block 296 in the event the selected choice is available as a selection, the process passes to block 298. In the manner described above, block 298 illustrates a determination of whether or not only a single choice from the list of textual choices is permitted. If so, the process passes to block 300 which illustrates the deselection of the previous choice. Thereafter, or in the event multiple choices are permitted, the process passes to block 302. Block 302 illustrates the selection of the current choice within the format entry table, the updating of the numeric indicator within numeric indicator area 80 and the movement of the selection cursor (see FIG. 8a and 8b). Thereafter, the process passes to block 304 which illustrates the normal processing of keyboard events.

Figure 15:
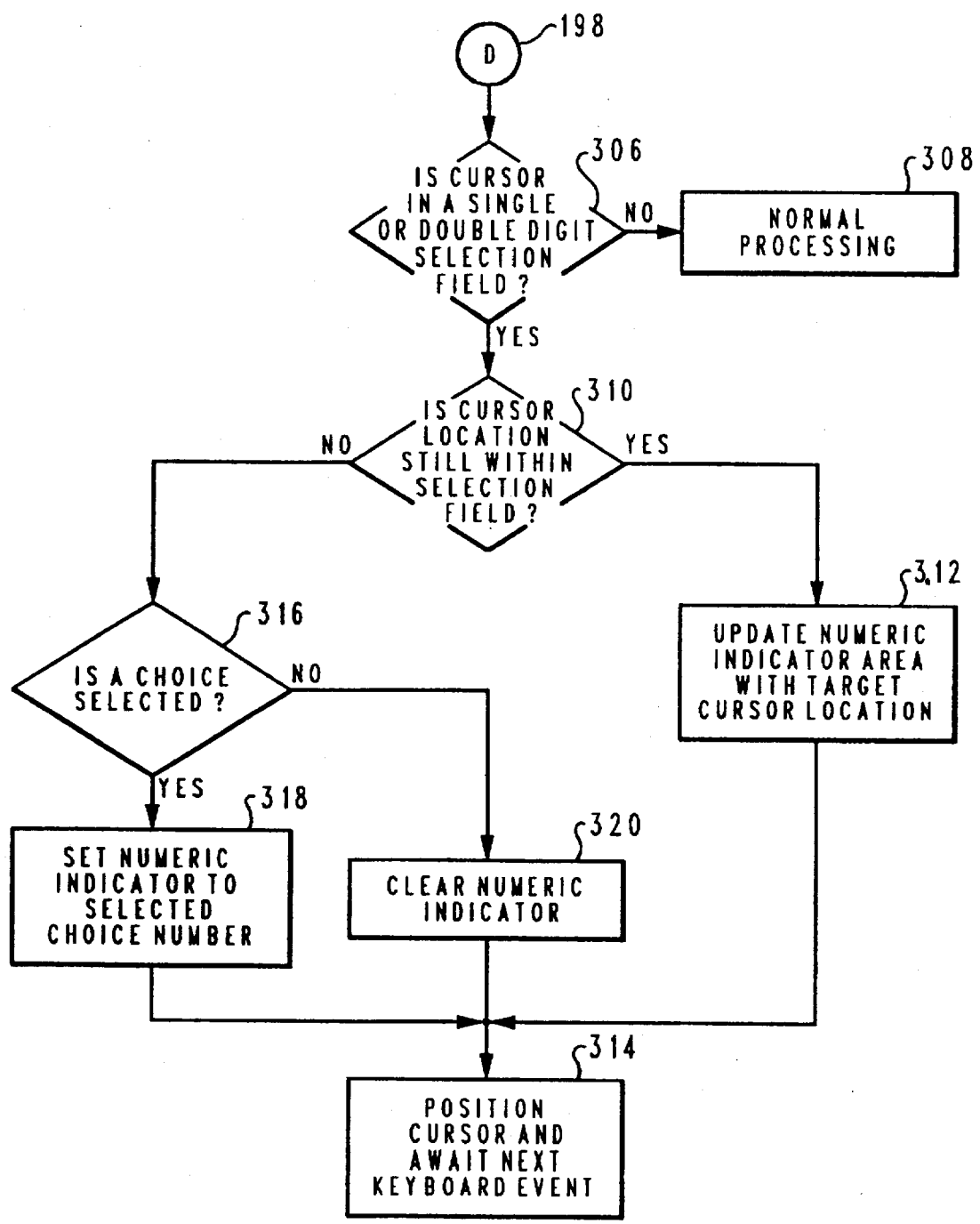
FIG. 15 is a high level logic flowchart illustrating the processing of cursor movement keys at a non-programmable terminal in accordance with the method and system of the present invention.

Finally, with reference to FIG. 15 there is depicted a high level logic flowchart which illustrates the processing of cursor movement keyboard events at a non-programmable terminal in accordance with the method and system of the present invention. As depicted, this process begins at connector D, as indicated at reference 198. Thereafter, the process passes to block 306. Block 306 illustrates a determination of whether or not the cursor is in a single or double digit selection field. If not, the process passes to block 308 which depicts the normal processing of keyboard events. Alternately, if the cursor is in a single or double digit selection field the process passes back to block 310. Block 310 illustrates a determination of whether or not the cursor location is still within the selection field. If so, the process passes to block 312. Block 312 illustrates the updating of the numeric indicator within numeric indicator area 80 (see FIG. 8a and 8b) with the target cursor location. Thereafter, the process passes to block 314. Block 314 illustrates the positioning of the cursor and the awaiting of the next keyboard event.

Referring again to block 310, in the event the cursor location is no longer within the selection field the process passes to block 316. Block 316 illustrates a determination of whether or not a choice is selected. Those skilled in the art will appreciate that the user may select a particular choice and then move the cursor from within the valid selection field. In the event a choice has been selected, the process passes to block 318. Block 318 illustrates the setting of the numeric indicator within numeric indicator area 80 (see FIGS. 8a and 8b) to the numeric character associated with the selected choice. Referring again to block 316, in the event a choice is no longer selected, the process passes to block 320. Block 320 illustrates the clearing of the numeric indicator within the indicator field. Thereafter, or after setting the numeric indicator to indicate the selection of a choice, the process passes to block 314 to position the cursor and await the next keyboard event.

Upon reference to the foregoing those skilled in the art will appreciate that the Applicants herein have provided a novel and useful method and system whereby single and double digit selection fields within a non-programmable terminal may be utilized to provide a simulated graphic selection of textual choices within a listing of textual choices by associating a numeric character with each such textual choice and providing an indicator field which displays the current selection by the user such that visual affirmation of the textual choice to be selected upon an entry may be provided. In accordance with this method and system an efficient technique is provided for directly selecting particular textual choices within a list of such choices which also provides a highly intuitive simulated graphic interface for increased usability.

While the invention has been particularly shown and described with reference to a preferred embodiment, it will be understood by those skilled in the art that various changes in form and detail may be made therein without departing from the spirit and scope of the invention.

We claim:

1. A method in a data processing system having a host processor, a workstation controller and a plurality of non-programmable terminals which each include a display screen, for implementing a simulated graphic single choice selection field within a non-programmable terminal, said method comprising the steps of:

transmitting a data stream from said host processor to said workstation controller, said data stream including data representative of a selection field construct which includes a plurality of numerically designated selectable textual choices of a number greater than nine, a numeric indicator area construct and position information;

constructing a format table entry within said workstation controller in response to receipt of said data stream, said format table entry including keystroke interpretation data, said selection field construct, a listing of numeric characters associated with each of said plurality of numerically designated selectable textual choices, said numeric indicator area construct and position information for specifying at least one panel within a display screen of a selected non-programmable terminal which contains a numeric indicator area;

utilizing said format table entry to create a display panel within a display screen of a selected non-programmable terminal which includes said plurality of numerically designated selectable textual choices and said numeric indicator area for receiving and displaying numeric keystroke entries by a user;

displaying within said numeric indicator area at least one numeric character corresponding to each numeric keystroke entry entered within said numeric indicator area by a user at said non-programmable terminal; and selecting first one of skid plurality of numerically designated selectable textual choices associated with said numeric character solely in response to a first numeric keystroke entry input by a user within said numeric identifier area at said non-programmable terminal and selecting a second one of said plurality of numerically designated selectable textual choices solely in response to a subsequent numeric keystroke entry input by a user within said numeric identifier area at said non-programmable terminal such that a user may efficiently select a single or double digit numerically designated selectable textual choice.

2. The method in a data processing system for implementing a simulated graphic single choice selection field within a non-programmable terminal according to claim 1, wherein said step of selecting a first one of said plurality of numerically designated selectable textual choices associated with said numeric character in response to a first numeric keystroke entry input by a user at said non-programmable terminal comprises selecting a single digit numerically designated selectable textual choice associated with a first numeric character displayed within said numeric indicator area in response to an input by a user at said non-programmable terminal.

3. The method in a data processing system for implementing a simulated graphic single choice selection field within a non-programmable terminal according to claim 1, wherein said data stream includes an offset value to a mnemonic character within each of said plurality of numerically designated selectable textual choices and wherein said step of constructing a format table entry within said workstation in response to receipt of said data stream further includes the step of constructing a format table entry including said offset value to a mnemonic character within each one of said plurality of numerically designated selectable textual choices.

4. The method in a data processing system for implementing a simulated graphic single choice selection field within a non-programmable terminal according to claim 3, further including the step of determining whether said non-programmable terminal supports display of a mnemonic character prior to creating said display panel.

5. The method in a data processing system for implementing a simulated graphic single choice selection field within a non-programmable terminal according to claim 1, wherein said data stream includes an identification of a default choice within said plurality of numerically designated selectable textual choices and wherein said step of displaying within said numeric indicator area a numeric character corresponding to each keystroke entered within said selection field by a user at said non-programmable terminal comprises the step of displaying within said numeric indicator area a numeric character associated with said default choice in response to an absence of a keystroke entered within said selection field by a user at said non-programmable terminal.

6. The method in a data processing system for implementing a simulated graphic single choice selection field within a non-programmable terminal according to claim 1, wherein said step of selecting a first one of said plurality of numerically designated selectable textual choices associated with a first numeric keystroke entry solely in response to an input by a user at said non-programmable terminal comprises the step of highlighting within said display screen said first one of said plurality of numerically designated selectable textual choices associated with said numeric character solely in response to an input by a user at said non-programmable terminal.

7. A data processing system for implementing a simulated graphic single choice selection field within a non-programmable terminal wherein said data processing system includes a host processor, a workstation controller and a plurality of non-programmable terminals which each include a display screen, said data processing system comprising:

means for transmitting a data stream from said host processor to said workstation controller, said data stream including data representative of a selection field construct which includes a plurality of numerically designated selectable textual choices of a number greater than nine, a numeric indicator area construct and position information;

means for constructing a format table entry within said workstation controller in response to receipt of said data stream, said format table entry including keystroke interpretation data, said selection field construct, a listing of numeric characters associated with each of said plurality of numerically designated selectable textual choices, said numeric indicator area for receiving and displaying keystroke entries by a user construct and position information for specifying at least one panel within a display screen of a selected non-programmable terminal which contains a numeric indicator area;

means for utilizing said format table entry to create a display panel within a display screen of a selected non-programmable terminal which includes said plurality of numerically designated selectable textual choices and said numeric indicator area for receiving and displaying numeric keystroke entries by a user;

means for displaying within said numeric indicator area a numeric character corresponding to each numeric keystroke entry entered within said selection field numeric indicator area by a user at said non-programmable terminal; and means for selecting a first one of said plurality of numerically designated selectable textual choices associated with said numeric character solely in response to a first numeric keystroke entry input by a user within said numeric identifier area at said non-programmable terminal and for selecting a second one of said plurality of numerically designated selectable textual choices solely in response to a subsequent numeric keystroke entry input by a user within said numeric identifier area at said non-programmable terminal such that a user may efficiently select a single or double digit numerically designated selectable textual choice.

8. The data processing system for implementing a simulated graphic single choice selection field within a non-programmable terminal according to claim 7, wherein said means for selecting a first one of said plurality of numerically designated selectable textual choices associated with said numeric character in response to a first numeric keystroke entry input by a user at said non-programmable terminal comprises means for selecting a single digit numerically designated selectable textual choice associated with a first numeric character displayed within said numeric indicator area in response to an input by a user at said non-programmable terminal.

9. The data processing system for implementing a simulated graphic single choice selection field within a non-programmable terminal according to claim 7, wherein said data stream includes an offset value to a mnemonic character within each of said plurality of numerically designated selectable textual choices and wherein said means for constructing a format table entry within said workstation in response to receipt of said data stream further includes means for constructing a format table entry including said offset value to a mnemonic character within each one of said plurality of numerically designated selectable textual choices.

10. The data processing system for implementing a simulated graphic single choice selection field within a non-programmable terminal according to claim 9, further including means for determining whether said non-programmable terminal supports display of a mnemonic character prior to creating said display panel.

11. The data processing system for implementing a simulated graphic single choice selection field within a non-programmable terminal according to claim 7, wherein said data stream includes an identification of a default choice within said plurality of numerically designated selectable textual choices and wherein means for displaying within said numeric indicator area at least one numeric character corresponding to each keystroke entered within said selection field by a user at said non-programmable terminal comprises means for displaying within said numeric indicator area a numeric character associated with said default choice in response to an absence of a keystroke entered within said selection field by a user at said non-programmable terminal.

12. The data processing system for implementing a simulated graphic single choice selection field within a non-programmable terminal according to claim 7, wherein said means for selecting a first one of said plurality of numerically designated selectable textual choices associated with a first numeric keystroke entry in response to an input by a user at said non-programmable terminal comprises means for highlighting within said display screen said first one of said plurality of numerically designated selectable textual choices associated with said numeric character in response to an input by a user at said non-programmable terminal.

* * * * *